(12) United States Patent
Cao et al.

(10) Patent No.: US 10,064,137 B2
(45) Date of Patent: Aug. 28, 2018

(54) HYBRID MONITORING-SLEEPING METHOD OF WIRELESS SENSOR AND WIRELESS SENSOR

(71) Applicant: SHANGHAI RESEARCH CENTER FOR WIRELESS COMMUNICATIONS, Shanghai (CN)

(72) Inventors: Wei Cao, Shanghai (CN); Yu Zhang, Shanghai (CN); Hua Qian, Shanghai (CN); Yang Yang, Shanghai (CN); Honglin Hu, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 19 days.

(21) Appl. No.: 15/382,524

(22) Filed: Dec. 16, 2016

(65) Prior Publication Data
US 2017/0181091 A1    Jun. 22, 2017

(30) Foreign Application Priority Data
Dec. 18, 2015    (CN) .......................... 2015 1 0962695

(51) Int. Cl.
  *H04W 52/02*    (2009.01)
  *H04L 12/801*   (2013.01)
  *H04W 84/18*    (2009.01)

(52) U.S. Cl.
  CPC ......... *H04W 52/0235* (2013.01); *H04L 47/14* (2013.01); *H04W 52/0216* (2013.01); *H04W 52/0229* (2013.01); *H04W 84/18* (2013.01); *Y02D 70/00* (2018.01)

(58) Field of Classification Search
None
See application file for complete search history.

(56) References Cited

PUBLICATIONS

Philipp Hurni et al., "MaxMAC: A Maximally Traffic-Adaptive MAC Protocol for Wireless Sensor Networks" EWSN'10 Proceedings of the 7th European conference on Wireless Sensor Networks; Feb. 17, 2010; pp. 289-305; ISBN: 978-3-642-11916-3.

Rawya Yehia Rizk, "Quality of Services in Wireless Sensor Networks" Wireless Sensor Network Contents; Aug. 28, 2013; pp. 643-669; ISBN: 978-1-4665-1810-0.

(Continued)

*Primary Examiner* — Kibrom T Hailu
(74) *Attorney, Agent, or Firm* — J.C. Patents

(57) ABSTRACT

A hybrid monitoring-sleeping method of wireless sensor and the wireless sensor are provided by the present invention, during N (N=N1+N2) monitoring-sleeping period, the wireless sensor monitors with the first monitoring duration, the wake-up data packet transmitted by the data acquisitor or the mobile terminal in the N1 monitoring-sleeping periods, and the wireless sensor monitors with the second monitoring duration, the wake-up data packet transmitted by the mobile terminal in the remaining N2 monitoring-sleeping periods. The first monitoring duration is longer than the second monitoring duration, N1 is less than or equal to N2, and the N1 first monitoring duration and the N2 second monitoring duration are alternatively distributed. Compared with the single monitoring duration used in the prior art, the total monitoring duration of the N monitoring-sleeping periods is reduced, as a result, the monitoring power consumption of the wireless sensor is also reduced.

10 Claims, 5 Drawing Sheets

(56) References Cited

PUBLICATIONS

Xenofon Fafoutis et al., "Receiver-initiated medium access control protocols for wireless sensor networks" Computer Networks; vol. 76; Jan. 15, 2015; pp. 55-74; ISSN: 1389-1286.
The extended European Search Report of corresponding European Application No. 16204802.9-1875, dated May 15, 2017.

HYBRID MONITORING-SLEEPING METHOD OF WIRELESS SENSOR AND WIRELESS SENSOR

CROSS-REFERENCE TO RELATED APPLICATIONS

This application claims priority to Chinese Patent Application No. 201510962695.6, filed on Dec. 18, 2015, which is hereby incorporated by reference in its entirety.

FIELD OF THE TECHNOLOGY

Embodiments of the present invention relate to a communication technology, and in particular to, a hybrid monitoring-sleeping method of a wireless sensor and the wireless sensor.

BACKGROUND

The wireless sensor network has been ever increasingly applied with its evolution. The most common scenario of the wireless sensor network is a data monitoring and acquisition system, which transmits the acquired data to a data processing server for summarizing, processing and etc. Generally, the data monitoring and acquisition system supports two kinds of modes, i.e. the remote data acquisition mode and the short-distance data acquisition mode. The remote data acquisition is a communication between a wireless sensor in charge of corresponding data acquisition and a remote data acquisitor, the acquired data is transmitted to a data acquisitor, and then transmitted to the data processing server via the data acquisitor. The short-distance data acquisition is a communication between a wireless sensor in charge of corresponding data acquisition and a short-distance hand-held mobile terminal, the acquired data is transmitted to the data processing server via the mobile terminal.

Power consumption is a main challenge faced by the data monitoring and acquisition system based on the wireless sensor network. Because most of the wireless sensors adopt battery charging, and it is unlikely to charge or, change the battery frequently, the wireless sensor generally uses the operation mode of "monitoring+sleeping" to reduce the power consumption, and during the data acquisition, the wireless sensor is woken up by the data acquisitor or the mobile terminal. The common monitoring-sleeping method includes a time-synchronous monitoring-sleeping method and a time-asynchronous monitoring-sleeping method. The time-synchronous monitoring-sleeping method makes use of the periodical characteristics of the data monitoring and acquisition task. Firstly, a strict time synchronization is performed between all the wireless sensors and the data acquisitor/mobile terminal; then, the wireless sensor is woken up at a preset time period to read the data. The main disadvantage of the proposed method is a poor flexibility of the acquisition duration, once out-of-synchronization occurs, data loss may be caused. Besides, the centralized reporting of mass data will easily lead to interference, and then result in data error. The time-asynchronous monitoring-sleeping method provides a high flexibility and reliability. The real-time data is obtained by immediately waking up the sensor node, and then the data is immediately reported in order to obtain the real-time determination from the system. This method requires a short monitoring-sleeping period of the wireless sensor, allowing timely response to the wake-up data packet transmitted by the data acquisitor and mobile terminal.

However, in the exiting time-asynchronous monitoring-sleeping method, the wireless sensor adopts the same monitoring durations for the data acquisitor and the mobile terminal, increasing the power consumption of wireless sensor within the monitoring duration and resulting in a large power consumption of the wireless sensor.

SUMMARY

Embodiments of the present invention provide a hybrid monitoring-sleeping method of a wireless sensor and the wireless sensor, so as to reduce the power consumption of wireless sensor.

In a first aspect of the present invention, there is provided a hybrid monitoring-sleeping method of a wireless sensor, which includes:

During N monitoring-sleeping periods, the wireless sensor adopts monitors with a first monitoring duration a wake-up data packet transmitted by a data acquisitor and a mobile terminal in N1 monitoring-sleeping periods;

The wireless sensor adopts monitors with a second monitoring duration the wake-up data packet transmitted by the mobile terminal during N2 monitoring-sleeping periods, wherein, N=N1+N2 and N1 is less than or equal to N2. The monitoring-sleeping period is the sum of the first monitoring duration and a first sleeping duration, the monitoring-sleeping period is the sum of the second monitoring duration and a second sleeping duration, and the first monitoring duration is longer than the second monitoring duration. The N1 first monitoring duration and the N2 second monitoring duration are alternatively distributed, and the N1, N2, N are all positive integers.

Optionally, a first average transmission rate is adopted for transmitting the data between the wireless sensor and the data acquisitor, a second average transmission rate is adopted for transmitting the data between the wireless transmitter and the mobile terminal, and the second average transmission rate is greater than the first average transmission rate.

Optionally, the first monitoring duration is the ratio of the size of wake-up data packet to the first average transmission rate, and the second monitoring duration is the ratio of the size of the wake-up data packet to the second average transmission rate, wherein, the first average transmission rate is an average transmission rate used for transmitting the data between the wireless sensor and the data acquisitor, and the second average transmission rate is an average transmission rate used for transmitting the data between the wireless transmitter and the mobile terminal, and the second average transmission rate is greater than the first average transmission rate.

Optionally, the method further includes:

Once monitoring the wake-up data packet within the first monitoring duration, the wireless sensor determines a first remaining receiving duration of the wake-up data packet, enters a sleeping state according to the first remaining receiving duration, enters a wake-up state at the end of the first remaining receiving duration, and transmits the acquired data to the data acquisitor;

Once monitoring the wake-up data packet within the second monitoring duration, the wireless sensor determines a second remaining receiving duration of the wake-up data packet, enters the sleeping state according to the second remaining receiving duration, enters the wake-up state at the end of the second remaining receiving duration, and transmits the acquired data to the mobile terminal.

Optionally, the method further includes:

When monitoring no wake-up data packet within the first monitoring duration, the wireless sensor enters the sleeping state in the first sleeping duration;

When monitoring no wake-up data packet within the second monitoring duration, the wireless sensor enters the sleeping state in the second sleeping duration.

In a second aspect of the present invention, there is provided a wireless sensor, which includes:

a first monitoring module, configured to monitor a wake-up data packet transmitted by a data acquisitor or a mobile terminal in a first monitoring duration during N1 monitoring-sleeping periods of N monitoring-sleeping periods;

a second monitoring module, configured to monitor the wake-up data packet transmitted by the mobile terminal in a second monitoring duration during N2 monitoring-sleeping periods, wherein, N=N1+N2 and N1 is less than or equal to N2. The monitoring-sleeping period is the sum of the first monitoring duration and a first sleeping duration, and the monitoring-sleeping period is the sum of the second monitoring duration and a second sleeping duration, and the first monitoring duration is longer than the second monitoring duration. The N1 first monitoring duration and the N2 second monitoring duration are alternatively distributed, and the N1, N2, N are all positive integers.

Optionally, a first average transmission rate is adopted for transmitting data between the wireless sensor and the data acquisitor, a second average transmission rate is adopted for transmitting data between the wireless transmitter and the mobile terminal, and the second average transmission rate is greater than the first average transmission rate.

Optionally, the first monitoring duration is the ratio of the size of the wake-up data packet to the first average transmission rate, and the second monitoring duration is the ratio of the size of the wake-up data packet to the second average transmission rate, wherein, the first average transmission rate is an average transmission rate used for transmitting data between the wireless sensor and the data acquisitor, and the second average transmission rate is an average transmission rate used for transmitting data between the wireless transmitter and the mobile terminal, herein, the second average transmission rate is greater than the first average transmission rate.

Optionally, the wireless sensor further includes:

a determining module, configured to determine a first remaining receiving duration of the wake-up data packet once the first monitoring module monitors the wake-up data packet within the first monitoring duration;

a sleeping module, configured to control the wireless sensor to enter a sleeping state according to the first remaining receiving duration;

a transmitting module, configured to determine that the wireless sensor enters a wake-up state at the end of the first remaining receiving duration, and transmit an acquired data to the data acquisitor;

the determining module is further configured to determine a second remaining receiving duration of the wake-up data packet, when the second monitoring module monitors the wake-up data packet within the second monitoring duration;

the sleeping module is further configured to control the wireless sensor to enter the sleeping state according to the second remaining receiving duration;

the transmitting module is further configured to determine that the wireless sensor enters a wake-up state at the end of the second remaining receiving duration, and transmit an acquired data to the mobile terminal.

Optionally, the wireless sensor further includes:

a sleeping module, configured to control the wireless sensor to enter the sleeping state in the first sleeping duration when the first monitoring module monitors no wake-up data packet within the first monitoring duration;

The sleeping module, further configured to control the wireless sensor to enter the sleeping state in the second sleeping duration, when the second monitoring module monitors no wake-up data packet within the second monitoring duration.

By adopting the hybrid monitoring-sleeping method of the wireless sensor and the wireless sensor itself according to the present invention, during N (N=N1+N2) monitoring-sleeping period, the wireless sensor monitors with the first monitoring duration the wake-up data packet transmitted by the data acquisitor or the mobile terminal in the N1 monitoring-sleeping periods, and the wireless sensor monitors with the second monitoring duration the wake-up data packet transmitted by the mobile terminal in the remaining N2 monitoring-sleeping periods, wherein the first monitoring duration is longer than the second monitoring duration, N1 is less than or equal to N2, and the N1 first monitoring duration and the N2 second monitoring duration are alternatively distributed. Compared with the single monitoring duration used in the prior art, the total monitoring duration during the N monitoring-sleeping periods is reduced and the monitoring power consumption of the wireless sensor is also reduced.

DETAILED DESCRIPTION

The present invention provides a hybrid monitoring-sleeping method of a wireless sensor, the proposed method is applied in a data monitoring and acquisition system based on the wireless sensor network, such as the existing public utility meter reading system, the environment real-time monitoring system under construction and the future intelligent plant monitoring system in the industrial 4.0. All the data acquisition systems will utilize a plurality of wireless sensors for data monitoring and acquisition. Generally, these data monitoring and acquisition system need to support two modes, i.e. remote data acquisition mode and short-distance data acquisition mode.

Figure 1:
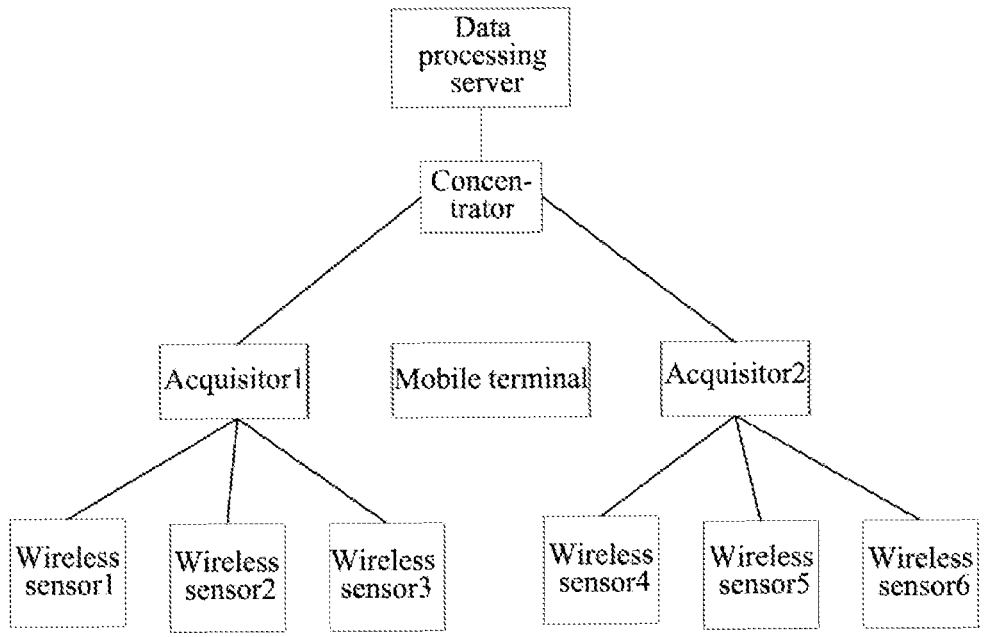
FIG. 1 is a structural schematic diagram of a data monitoring and acquisition system according to an embodiment of the present invention.

FIG. 1 is a structural schematic diagram of a data monitoring and acquisition system according to an embodiment of the present invention. As shown in FIG. 1, the data monitoring and acquisition system includes: a data processing server, a concentrator, two data acquisitors, a mobile terminal, and six wireless sensors. The wireless sensor is used for acquiring data, and then transmitting the acquired data to the data acquisitor or the mobile terminal. The data acquisitor or mobile terminal forwards the acquired data transmitted by the wireless sensor to the concentrator, and then the concentrator transmitted the acquired data to the data processing server. The data processing server is used to process the data acquired by the wireless sensor. In FIG. 1, the acquired data are transmitted to the data acquisitor 1 by the wireless sensors 1, 2, 3, then transmitted to the concentrator by the data acquisitor 1, and then transmitted to data processing server by the concentrator; the acquired data are transmitted to the data acquisitor 2 by the wireless sensors 4, 5, 6, then transmitted to the concentrator by the data acquisitor 2, and then transmitted to data processing server by the concentrator. In the actual process, the data acquisitor is often far away from the wireless sensor, thus the data acquisitor is also called the remote data acquisitor. When the user needs to acquire data, the mobile terminal is often close to the wireless sensor, thus the mobile terminal is also called the short-distance mobile terminal. It should be noted that, FIG. 1 only illustrates an example, and actually, the data monitoring and acquisition system also can include more or less data processing servers, data acquisitors, mobile terminals, concentrators and wireless sensors.

In this embodiment, the data monitoring and acquisition system supports two modes, i.e. remote data acquisition mode and short-distance data acquisition mode, in different time delay requirements and data transmission rates. Generally speaking, the real-time requirements of the remote data acquisition performed by the data acquisitor are relatively low, due to the batch processing of the remote data acquisition. However, the real-time requirements of the short-distance data acquisition performed by the mobile terminal is very high, that is because every time when the operator acquires the data from the single wireless sensor, a timely feedback is needed for improving the labor efficiency. Hereby, with this two modes, the time requirements for waking-up the wireless sensor are different, meaning that the wake-up time delay of the remote data acquisition could be long (minute-level), but the wake-up time delay of the short-distance data acquisition could be short (second-level). Hereby, the wake-up monitoring for remote data acquisition may be sparser, whereas the wake-up monitoring for the short-distance data acquisition may be denser.

Aiming at the data transmission rate, in a free space, the theoretical path loss corresponding to a 10 times distance difference is 20 dB, whereas in the actual communication environment, this path loss is greater. An over 20 dB path loss implies a great difference among the supported communication rates. Generally speaking, there is a far distance (tens of meters) between the data acquisitor and the wireless sensor, so the data interaction could only be performed at a relatively low rate. However, in the data acquisition with the mobile terminal, which has a short distance (about 1-2 meters) from the wireless sensor, a higher rate could be supported for communication, so as to reduce the operation time of the wireless sensor, complete the data transmission as soon as possible, enters a sleep mode and reduce the power consumption.

Figure 2:
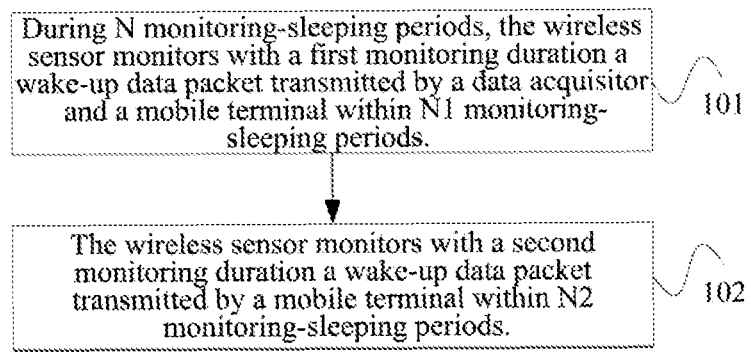
FIG. 2 is a flowchart of a hybrid monitoring-sleeping method of a wireless sensor according to Embodiment 1 of the present invention.

Based on the characteristics of time delay requirement and data transmission rate of the two modes, the present invention proposes a hybrid monitoring-sleeping method of the wireless sensor. Under the premise of guaranteeing the requirements of wake-up time delay, the method significantly reduces the power consumption of the wireless sensor, hereby being helpful to prolonging the operating duration of the wireless sensor. FIG. 2 is a flowchart of a hybrid monitoring-sleeping method of a wireless sensor according to Embodiment 1 of the present invention. As shown in FIG. 2, the method in this embodiment includes the following steps:

step 101: during N monitoring-sleeping periods, the wireless sensor monitors with a first monitoring duration a wake-up data packet transmitted by a data acquisitor and a mobile terminal within N1 monitoring-sleeping periods.

step 102: the wireless sensor adopts monitors with a second monitoring duration a wake-up data packet transmitted by a mobile terminal within N2 monitoring-sleeping periods.

Wherein, N=N1+N2, N1 is less than or equal to N2, and N1, N2, N are all positive integers. The monitoring-sleeping period is equal to the sum of the first monitoring duration and the first sleeping duration, and the monitoring-sleeping period is also equal to the sum of the second monitoring duration and the second sleeping duration. The first monitoring duration is longer than the second monitoring duration, and accordingly, the first sleeping duration is shorter than the second sleeping duration. The first monitoring duration is configured to monitor the wake-up data packet transmitted by the data acquisitor or the mobile terminal, and the second monitoring duration is configured to monitor the wake-up data packet transmitted by the mobile terminal. Optionally, the first average transmission rate is adopted for transmitting data between the wireless sensor and data acquisitor, the second average transmission rate is adopted between the wireless transmitter and mobile terminal, wherein, the second average transmission rate is greater than the first average transmission rate. It should be noted that, when the data acquisitor transmits the wake-up data packet to the wireless sensor, the transmission rate in each period may be different. Suppose that the total time of the wake-up data packet is 10s, then a higher transmission rate can be adopted in the first 5s and a lower transmission rate can be adopted in the last 5s, such that the average transmission rate is equal to the average transmission rate of the wake-up data packet within 10s.

Optionally, the first monitoring duration is the ratio of the size of wake-up data packet to the first average transmission rate, and the second monitoring duration is equal to the ratio of the size of wake-up data packet to the second average transmission rate. Due to that the monitoring duration required in the wireless sensor is inversely proportional to the corresponding communication rate, and the second average transmission rate is greater than the first average transmission rate, so the first monitoring duration is longer than the second monitoring duration.

Suppose that the data transmission rate supported by the wireless sensor is $\{R_a, R_b\}$ wherein $R_a$ is the first average transmission rate, $R_b$ is the second average transmission rate, and $R_b > R_a$; Suppose that the size of the interactive wake-up data packet in the arousal process of wireless sensor is M, then the first monitoring duration required by the wireless sensor for monitoring the wake-up data packet transmitted by the data acquisitor is $$T_{w,a} = \frac{M}{R_a},$$

and the second monitoring duration required by the wireless sensor for monitoring the wake-up data packet transmitted by the mobile terminal is $$T_{w,b} = \frac{M}{R_b}.$$

In the prior art, in order to simultaneously support the two modes, i.e., remote data acquisition mode and short-distance data acquisition mode, the monitoring duration should be a larger $T_{w,a}$, so the total monitoring duration during the N monitoring-sleeping periods is $N*T_{w,a}$, meaning that the corresponding monitoring power consumption is high.

In this embodiment, the N1 first monitoring duration and N2 second monitoring duration are alternatively distributed, that is to say, the second monitoring duration should at least exist between any two of the first monitoring durations.

However, in the method of this embodiment, during the N monitoring-sleeping periods, the first monitoring duration is adopted for monitoring the wake-up data packet transmitted by the data acquisitor or the mobile terminal within the N1 monitoring-sleeping periods, and the second monitoring duration is adopted for monitoring the wake-up data packet transmitted by the mobile terminal within the N2 monitoring-sleeping periods, then the total monitoring duration within the N monitoring-sleeping periods is $N1*T_{w,a}+N2*T_{w,b}$. Since N=N1+N2 and $R_b>R_a$, $N1*T_{w,a}+N2*T_{w,b}$ is less than $N*T_{w,a}$ meaning that, during the N monitoring-sleeping periods, the total monitoring duration becomes shorter, and accordingly, the monitoring power consumption becomes lower.

In the method of this embodiment, during the N (N=N1+N2) monitoring-sleeping period, the wireless sensor monitor with the first monitoring duration the wake-up data packet transmitted by the data acquisitor or the mobile terminal within the N1 monitoring-sleeping periods, and the wireless sensor monitors with the second monitoring duration the wake-up data packet transmitted by the mobile terminal within the remaining N2 monitoring-sleeping periods. The first monitoring duration is longer than the second monitoring duration, N1 is less than or equal to N2, and the N1 first monitoring duration and N2 second monitoring duration are alternatively distributed. Compared with the single monitoring duration used in the prior art, the total monitoring duration is reduced during the N monitoring-sleeping periods, thereby reducing the monitoring power consumption of the wireless sensor.

Figure 3:
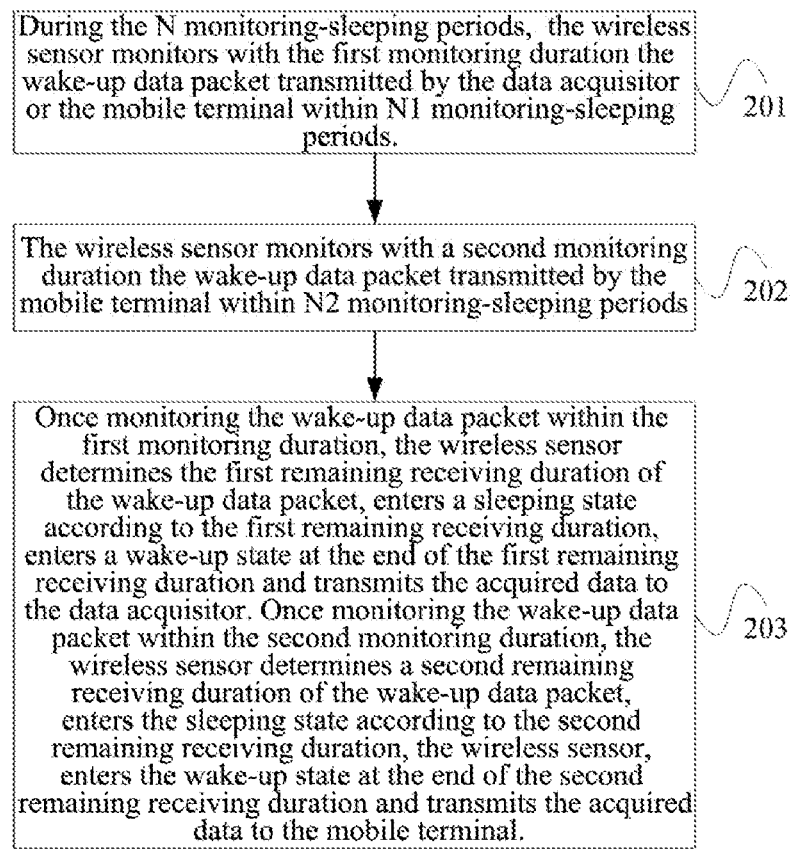
FIG. 3 is a flowchart of a hybrid monitoring-sleeping method of a wireless sensor according to Embodiment 2 of the present invention.

FIG. 3 is a flowchart of a hybrid monitoring-sleeping method of the wireless sensor according to Embodiment 2 of the present invention. As shown in FIG. 3, the method in this embodiment includes the following steps:

step 201: during the N monitoring-sleeping periods, the wireless sensor monitors with the first monitoring duration the wake-up data packet transmitted by the data acquisitor or the mobile terminal within N1 monitoring-sleeping periods.

step 202: the wireless sensor monitors with the second monitoring duration the wake-up data packet transmitted by the mobile terminal within N2 monitoring-sleeping periods.

step 203: once monitoring the wake-up data packet within the first monitoring duration, the wireless sensor determines the first remaining receiving duration of the wake-up data packet, enters a sleeping state according to the first remaining receiving duration, enters a wake-up state at the end of the first remaining receiving duration and transmits the acquired data to the data acquisitor. Once monitoring the wake-up data packet within the second monitoring duration, the wireless sensor determines a second remaining receiving duration of the wake-up data packet, enters the sleeping state according to the second remaining receiving duration, the wireless sensor, enters the wake-up state at the end of the second remaining receiving duration and transmits the acquired data to the mobile terminal.

In this embodiment, the first monitoring duration and the second monitoring duration are both shorter than the duration of the wake-up data packet, thus, when monitoring the wake-up data packet, the wireless sensor may continue sleeping until completing transmitting the remaining wake-up data packet. In this embodiment, at the end of the first monitoring duration or the second monitoring duration, the wake-up data packet is monitored, the wireless sensor determines the first remaining receiving duration or the second remaining receiving duration of the wake-up data packet; however, instead of continuing receiving the wake-up data packet in the first remaining receiving duration and second remaining receiving duration, the wireless sensor enters a sleeping state, and at the end of the first remaining receiving duration or the second remaining receiving duration, that is to say, at the end of sleeping, the acquired data are transmitted to the data acquisitor or the mobile terminal. The wireless sensor can determine the first remaining receiving duration and the second remaining receiving duration of the wake-up data packet by using the prior art, which is not specifically illustrated in this embodiment.

Of course, the wake-up data packet may not be monitored by the wireless sensor within the first monitoring duration or the second monitoring duration. Once not monitoring the wake-up data packet in the first monitoring duration, the wireless sensor enters a sleeping state in the first sleeping duration, and once not monitoring the wake-up data packet in the second monitoring duration, the wireless sensor enters a sleeping state in the second sleeping duration.

Figure 4:
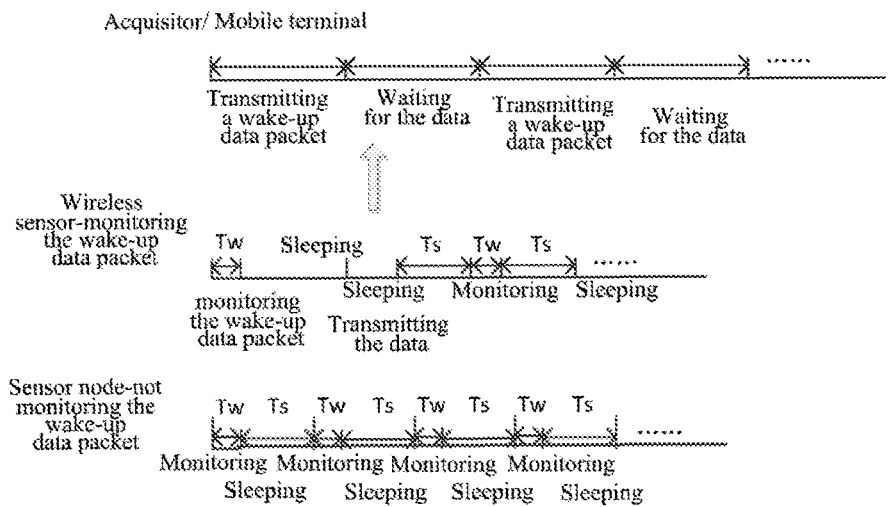
FIG. 4 is a data interaction process between a data acquisitor/mobile terminal and a wireless sensor.

FIG. 4 is a data interaction process between a data acquisitor/mobile terminal and a wireless sensor. As shown in FIG. 4, the wake-up data packet is transmitted to the wireless sensor by the data acquisitor or the mobile terminal periodically or according to the requirements. After completing the wake-up data packet, the data transmitted by the wireless sensor are received. The wake-up data packet is monitored by the wireless sensor within the monitoring duration $T_w$, wherein $T_w$ in FIG. 4 represents either the first monitoring duration or the second monitoring duration, and $T_s$ is the sleeping duration of the wireless sensor. From the FIG. 4, once monitoring the wake-up data packet within the monitoring duration $T_w$, the wireless sensor enters the sleeping state so as to reduce the invalid monitoring. When the data acquisitor or the mobile terminal completes transmitting the wake-up data packet, the wireless sensor is aroused and then transmits the acquired data to the data acquisitor or mobile terminal. After completing transmitting the acquired data, the wireless sensor enters the sleeping state, and after the sleeping duration $T_s$, the wireless sensor enters monitoring duration $T_w$, the sum of the monitoring duration $T_w$ and the sleeping duration $T_s$ in FIG. 3 is a monitoring-sleeping period. When not monitoring the wake-up data packet in the monitoring duration $T_w$, the wireless sensor enters sleep in the sleeping duration $T_s$, and then repeats monitoring and sleeping.

Figure 5:
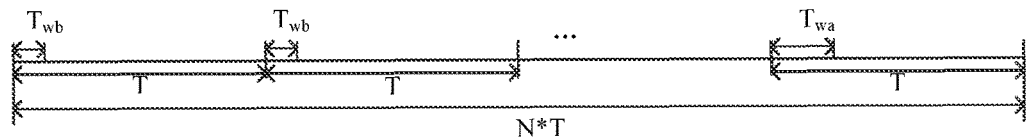
FIG. 5 is a schematic diagram of a monitoring-sleeping period.

FIG. 5 is a schematic diagram of a monitoring-sleeping period. As an example shown in FIG. 5, there are totally N monitoring-sleeping periods with each duration of T, and N1=1, N2=N−1, that is to say, during the N monitoring-sleeping period, the first monitoring duration $T_{w,a}$ is adopted in one monitoring-sleeping period, and the second monitoring duration $T_{w,b}$ is adopted in the remaining monitoring-sleeping periods. By this duration, the proportion of the monitoring duration is $$\frac{(N-1)T_{w,b} + T_{w,a}}{NT} < \frac{T_{w,a}}{T},$$

wherein $$\frac{T_{w,a}}{T}$$

is the proportion of the monitoring duration in the prior art. The comparison shows that the proportion of the monitoring duration of the present invention is less than that of the prior art, hereby effectively reducing the monitoring power consumption.

The battery operating duration of wireless sensor is inversely proportional to the average power consumption of wireless sensor, and the average power consumption of wireless sensor is proportional to the average operation current of wireless sensor. Suppose that the current of the wireless sensor is $I_s$ in the sleeping state and $I_w$ in the monitoring state. In the single monitoring period with the monitoring duration of $T_{w,a}$ the average current of wireless sensor in one monitoring-sleeping period is $$I_1 = \frac{I_w \cdot T_{w,a} + I_s \cdot (T - T_{w,a})}{T}.$$

However, with the hybrid monitoring-sleeping method of the wireless sensor proposed by the present invention, the average current of wireless sensor in one monitoring-sleeping period is $$I_2 = \frac{I_w \cdot (T_{w,a} + (N-1)T_{w,b}) + I_s \cdot (NT - T_{w,a} - (N-1)T_{w,b})}{NT}.$$

Obviously, $I_1 > I_2$, that is to say, the method of the present invention is help for reducing the average power consumption and prolonging the battery operating duration of the wireless sensor.

In the present invention, the wireless sensor may make use of si4464 chip, which can support different data transmission rates, possesses the power-saving mode with ultra-low current, and be widely used in the wireless sensor network. The specific operating parameters table is as follow. The chip is taken as an example to analyze the performance advantages of the hybrid monitoring-sleeping method proposed by the present invention. Table 1 is the parameters for using si4464 chip:

TABLE 1

| Data transmission rate | Current |
|---|---|
| $R_a$: 0.123 Kbps | $I_s$ in sleeping state: 900 nA |
| $R_b$: 1 Mbps | $I_w$ in monitoring state: 7.2 mA |

In Table 1, $R_a$ is the first average transmission rate, and $R_b$ is the second average transmission rate. Suppose that the size of the wake-up data packet is 200 bit, N=1, N1=1, N2=59, $R_a$=0.123 Kbps=123 bps, and $R_b$=1 Mbps=1×10$^6$ bps, then the first monitoring duration is $$T_{w,a} = \frac{200}{123} = 1.59 \text{ s},$$

and the second monitoring duration is $$T_{w,b} = \frac{200}{1 \times 10^6} = 1.91e - 4 \text{ s}.$$

Figure 6:
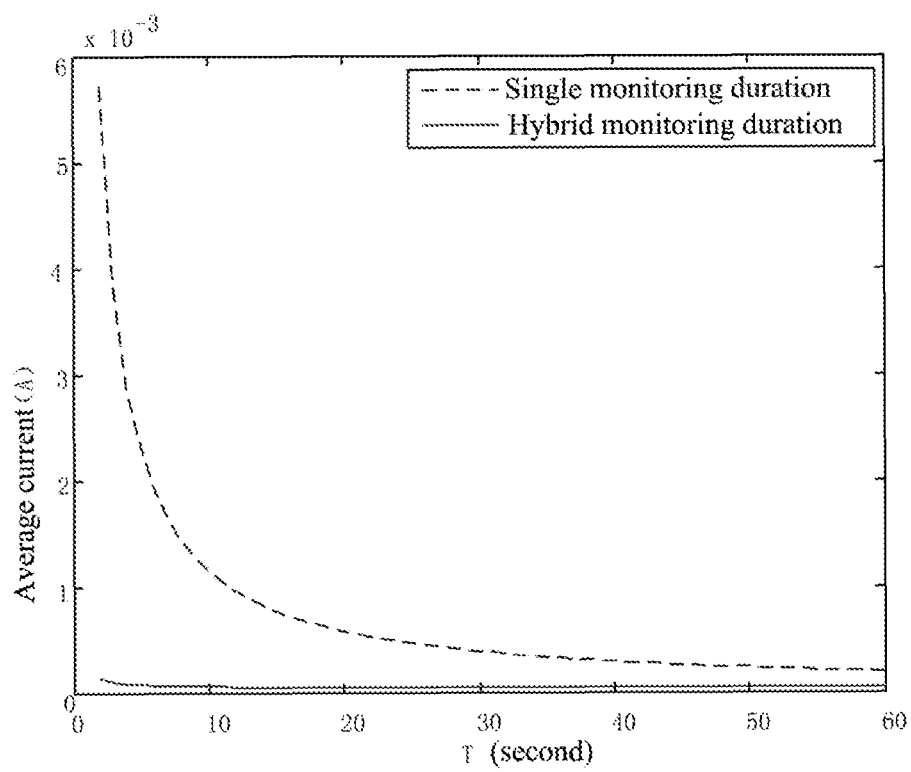
FIG. 6 is a schematic diagram of comparison between an average current required in the existing single monitoring duration and that in the hybrid monitoring duration of the present invention.

FIG. 6 is a schematic diagram of comparison between an average current required in the existing single monitoring duration and that in the hybrid monitoring duration of the present invention. As shown in FIG. 6, the x-axis represents the monitoring duration, the y-axis represents the average current, the dash line represents the average current required in the single monitoring duration of wireless sensor, and the solid line represents the average current required in the hybrid monitoring duration of the wireless sensor. By comparison, it is obtained that the average current required in the hybrid monitoring duration is far less than that required in the single monitoring duration.

Table 2 shows the current data in different monitoring-sleeping periods selected from FIG. 6:

TABLE 2

| T | 2 s | 5 s | 10 s | 30 s | 60 s |
|---|---|---|---|---|---|
| Single monitoring period $I_1$ (A) | 0.0057 | 0.0023 | 0.0011 | 0.0004 | 0.0002 |
| Hybrid monitoring period $I_2$ (A) | 9.684e−5 | 3.928e−5 | 2.009e−5 | 7.30e−6 | 4.10e−6 |

Obviously, when the monitoring-sleeping period is short, the hybrid monitoring period proposed by the present invention has more obvious advantages of low power consumption. With a typical value of monitoring-sleeping period of 2s, the difference of the average current between the single monitoring period and the hybrid monitoring period is up to 59.03 times, showing that the method proposed by the present invention is more suitable for the short response time required in the data acquisition of the mobile terminal, and perfectly corresponding to the application scenarios requirements of short-distance data acquisition of the mobile terminal.

In the method of this embodiment, once monitoring the wake-up data packet within the first monitoring duration, the wireless sensor determines a first remaining receiving duration of the wake-up data packet, enters a sleeping state according to the first remaining receiving duration, enters a wake-up state and transmits the acquired data to the data acquisitor at the end of the first remaining receiving duration. Once monitoring the wake-up data packet within the second monitoring duration, the wireless sensor determines a second remaining receiving duration of the wake-up data packet, enters the sleeping state according to the second remaining receiving duration, enters the wake-up state and transmits the acquired data to the mobile terminal at the end of the second remaining receiving duration. In the method, the wireless sensor is still in a sleeping state before the end of the first remaining receiving duration and the second remaining receiving duration, hereby preventing invalidly monitoring and further reducing the monitoring power consumption of the wireless sensor.

Figure 7:
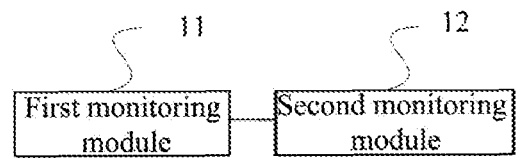
FIG. 7 is a structural schematic diagram of a wireless sensor according to Embodiment 3 of the present invention.

FIG. 7 is a structural schematic diagram of a wireless sensor according to Embodiment 3 of the present invention. As shown in FIG. 7, the wireless sensor provided by this embodiment includes a first monitoring module 11 and a second monitoring module.

Wherein, the first monitoring module 11 is configured to monitor with the first monitoring duration the wake-up data packet transmitted by the data acquisitor or the mobile terminal within N1 monitoring-sleeping periods during the N monitoring-sleeping periods;

The second monitoring module 12 is configured to monitor with the second monitoring duration the wake-up data packet transmitted by the mobile terminal within N2 monitoring-sleeping periods.

Wherein, N=N1+N2, and N1 is less than or equal to N2. The monitoring-sleeping period is equal to the sum of the first monitoring duration and the first sleeping duration, and the monitoring-sleeping period is also equal to the sum of the second monitoring duration and the second sleeping duration. The first monitoring duration is longer than the second monitoring duration, the N1 first monitoring duration and the N2 second monitoring duration are alternatively distributed, and the N1, N2, N are all positive integers.

Optionally, the first average transmission rate is adopted for transmitting the data between the wireless sensor and the data acquisitor, and the second average transmission rate is adopted for transmitting the data between the wireless transmitter and the mobile terminal, wherein, the second average transmission rate is greater than the first average transmission rate.

Optionally, the first monitoring duration is equal to the ratio of the size of the wake-up data packet to the first average transmission rate, and the second monitoring duration is equal to the ratio of the size of the wake-up data packet to the second average transmission rate.

The wireless sensor in this embodiment may be used to perform the method of the embodiment 1 with the similar implementation principle and technical effect, and there is no need to repeat it here.

Figure 8:
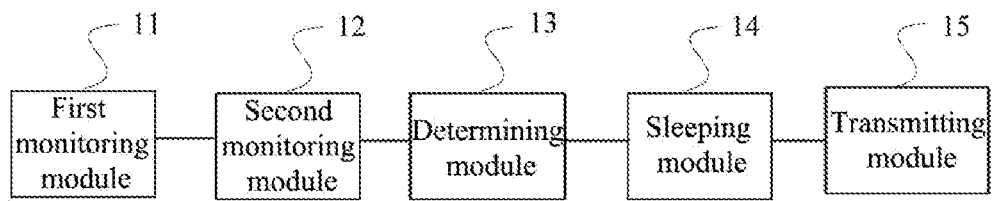
FIG. 8 is a structural schematic diagram of a wireless sensor according to Embodiment 4 of the present invention.

FIG. 8 is a structural schematic diagram of a wireless sensor according to Embodiment 4 of the present invention. As shown in FIG. 8, based on the sensor illustrated in FIG. 7, the wireless sensor provided by this embodiment further includes a determining module 13, a sleeping module 14 and a transmitting module 15.

The determining module 13 is configured to determine a first remaining receiving duration of the wake-up data packet once the first monitoring module 11 monitors the wake-up data packet within the first monitoring duration, the sleeping module 14 is configured to control the wireless sensor to enter the sleeping state according to the first remaining receiving duration, and the transmitting module 15 is configured to determine that the wireless sensor has enter the wake-up state at the end of the first remaining receiving duration and transmit the acquired data to the data acquisitor.

The determining module 13 is further configured to determine a second remaining receiving duration of the wake-up data packet once the second monitoring module 12 monitors the wake-up data packet with the second monitoring duration, the sleeping module 14 is further configured to control the wireless sensor to enter the sleeping state according to the second remaining receiving duration, and the transmitting module 15 is further configured to determine that the wireless sensor enters the wake-up state at the end of the second remaining receiving duration and transmit the acquired data to the mobile terminal.

The sleeping module 14 is further configured to control the wireless sensor to enter the sleeping state within the first sleeping duration when the first monitoring module 11 does not monitor the wake-up data packet within the first monitoring duration, and control the wireless sensor to enter the sleeping state within the second sleeping duration when the second monitoring module 12 does not monitor the wake-up data packet within the second monitoring duration.

The wireless sensor in this embodiment may be used to perform the method in Embodiment 2 with the similar implementation principle and technical effect, and there is no need to repeat it here.

Persons skilled in the art should understand that, some or all steps for implementing the above method embodiments may be completed by a program instructing the related hardware. The program can be stored in a computer readable storage medium and can implement the steps in the above method embodiments. The storage medium includes ROM, RAM, diskette magnetic disks, or optical disks and various mediums capable of storing program codes.

Finally, it should be noted that the above embodiments are only used to illustrate the technical solutions of the present invention, rather than to limit thereto. It should be understood by persons skilled in the art that although this application has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of this application.

What is claimed is:

1. A hybrid monitoring-sleeping method of a wireless sensor, characterized by comprising:

during N monitoring-sleeping periods, monitoring, by the wireless sensor with a first monitoring duration, a wake-up data packet transmitted by a data acquisitor or a mobile terminal within N1 monitoring-sleeping periods, wherein the first monitoring duration corresponds a first average transmission rate that is adopted for transmitting the data between the wireless sensor and the data acquisitor in a remote data acquisition mode;

monitoring, by the wireless sensor with a second monitoring duration, the wake-up data packet transmitted by the mobile terminal within N2 monitoring-sleeping periods, wherein the second monitoring duration corresponds to a second average transmission rate that is adopted for transmitting the data between the wireless sensor and the mobile terminal in a short-distance data acquisition mode, wherein, N=N1+N2, N1 is less than or equal to N2, a monitoring-sleeping period of the N1 monitoring-sleeping periods is equal to the sum of the first monitoring duration and a first sleeping duration, and a monitoring-sleeping period of the N2 monitoring-sleeping periods is equal to the sum of the second monitoring duration and a second sleeping duration, the first monitoring duration is longer than the second monitoring duration, N1 first monitoring durations and N2 second monitoring durations are alternatively distributed, and the N1, N2, N are all positive integers.

2. The method as claimed in claim 1, wherein the second average transmission rate is greater than the first average transmission rate.

3. The method as claimed in claim 1, wherein the first monitoring duration is proportional to the ratio of the size of the wake-up data packet to the first average transmission rate, and the second monitoring duration is proportional to the ratio of the size of the wake-up data packet to the second average transmission rate, the second average transmission rate is greater than the first average transmission rate.

4. The method as claimed in claim 1, further comprising:
when monitoring the wake-up data packet within the first monitoring duration, determining, by the wireless sensor, a first remaining receiving duration of the wake-up data packet, entering a sleeping state according to the first remaining receiving duration, entering a wake-up state at the end of the first remaining receiving duration, and transmitting the acquired data to the data acquisitor;
when monitoring the wake-up data packet within the second monitoring duration, determining, by the wireless sensor, a second remaining receiving duration of the wake-up data packet, entering the sleeping state according to the second remaining receiving duration, entering the wake-up state at the end of the second remaining receiving duration and transmitting the acquired data to the mobile terminal.

5. The method as claimed in claim 1, further comprising:
when monitoring no wake-up data packet within the first monitoring duration, entering, by the wireless sensor, the sleeping state in the first sleeping duration;
when monitoring no wake-up data packet within the second monitoring duration, entering, by the wireless sensor, the sleeping state in the second sleeping duration.

6. A wireless sensor, characterized by comprising:
a processor; and
a computer-readable medium for storing program codes, which, when executed by the processor, cause the processor to:
monitor with a first monitoring duration a wake-up data packet transmitted by a data acquisitor or a mobile terminal within N1 monitoring-sleeping periods during N monitoring-sleeping periods, wherein the first monitoring duration corresponds to a first average transmission rate that is adopted for transmitting the data between the wireless sensor and the data acquisitor in a remote data acquisition mode;
monitor with a second monitoring duration the wake-up data packet transmitted by the mobile terminal within N2 monitoring-sleeping periods, the second monitoring duration corresponds to a second average transmission rate that is adopted for transmitting the data between the wireless sensor and the mobile terminal in a short-distance data acquisition mode, wherein N=N1+N2, N1 is less than or equal to N2, and a monitoring-sleeping period of the N1 monitoring-sleeping periods is equal to the sum of the first monitoring duration and a first sleeping duration, and a monitoring-sleeping period of the N2 monitoring-sleeping periods is equal to the sum of the second monitoring duration and a second sleeping duration, the first monitoring duration is longer than the second monitoring duration, the N1 first monitoring duration and the N2 second monitoring duration are alternatively distributed, and the N1, N2, N are all positive integers.

7. The wireless sensor as claimed in claim 6, wherein the second average transmission rate is greater than the first average transmission rate.

8. The wireless sensor as claimed in claim 6, wherein the first monitoring duration is proportional to the ratio of the size of the wake-up data packet to the first average transmission rate, and the second monitoring duration is proportional to the ratio of the size of the wake-up data packet to the second average transmission rate, the second average transmission rate is greater than the first average transmission rate.

9. The wireless sensor as claimed in claim 6, wherein the program codes further cause the processor to:
determine a first remaining receiving duration of the wake-up data packet when the wake-up data packet is monitored within the first monitoring duration;
control the wireless sensor to enter a sleeping state according to the first remaining receiving duration;
determine that the wireless sensor enters a wake-up state at the end of the first remaining receiving duration, and transmit the acquired data to the data acquisitor;
determine a second remaining receiving duration of the wake-up data packet when the wake-up data packet is monitored within the second monitoring duration;
control the wireless sensor to enter the sleeping state within the second remaining receiving duration; and
determine that the wireless sensor enters the wake-up state at the end of the second remaining receiving duration, and transmit the acquired data to the data acquisitor.

10. The wireless sensor as claimed in claim 6, wherein the program codes further cause the processor to:
control the wireless sensor to enter the sleeping state in the first sleeping duration when monitoring no wake-up data packet within the first monitoring duration; and
control the wireless sensor to enter the sleeping state in the second sleeping duration when monitoring no wake-up data packet within the second monitoring duration.

* * * * *